(12) United States Patent  
Weyer

(10) Patent No.: US 9,129,440 B2  
(45) Date of Patent: Sep. 8, 2015

(54) METHOD AND APPARATUS FOR MANAGING AND DISPLAYING DATA

(71) Applicant: Frank Michael Weyer, Hollywood, CA (US)

(72) Inventor: Frank Michael Weyer, Hollywood, CA (US)

( * ) Notice: Subject to any disclaimer, the term of this patent is extended or adjusted under 35 U.S.C. 154(b) by 82 days.

(21) Appl. No.: 13/950,310

(22) Filed: Jul. 25, 2013

(65) Prior Publication Data

US 2014/0347364 A1     Nov. 27, 2014

Related U.S. Application Data

(60) Provisional application No. 61/827,026, filed on May 24, 2013.

(51) Int. Cl.

| | |
|---|---|
| *G06T 11/20* | (2006.01) |
| *G09B 27/00* | (2006.01) |
| *G06Q 10/10* | (2012.01) |
| *G02B 23/00* | (2006.01) |
| *G02B 23/16* | (2006.01) |
| *G06K 9/62* | (2006.01) |
| *G01S 3/786* | (2006.01) |
| *G06F 3/0484* | (2013.01) |
| *G06Q 50/00* | (2012.01) |

(52) U.S. Cl.  
CPC .............. *G06T 11/206* (2013.01); *G06Q 10/10* (2013.01); *G09B 27/00* (2013.01); *G01S 3/7867* (2013.01); *G02B 23/00* (2013.01); *G02B 23/16* (2013.01); *G06F 3/0484* (2013.01); *G06K 9/622* (2013.01); *G06K 9/6215* (2013.01); *G06K 9/6234* (2013.01); *G06K 9/6253* (2013.01); *G06Q 50/01* (2013.01)

(58) Field of Classification Search  
None  
See application file for complete search history.

(56) References Cited

U.S. PATENT DOCUMENTS

2006/0238860 A1* 10/2006 Baun et al. ..................... 359/429  
2010/0124735 A1* 5/2010 Chen et al. ..................... 434/284

* cited by examiner

*Primary Examiner* — Jwalant Amin  
(74) *Attorney, Agent, or Firm* — Techcoastlaw

(57) ABSTRACT

The present invention comprises a novel method and apparatus for displaying and managing relationships between data elements of a database, including, without limitation, relationships between data elements representing or associated with members of a social network in a social network database. In one or more embodiments, attributes or values of data elements of a database are interpreted as unique locations in a multidimensional environment. Data elements are graphically displayed from the perspective of a point within the multidimensional environment. Attributes and relationships between data elements are displayed by visual characteristics of the displayed data elements (e.g. location, color, shape, animation) and by graphical elements connecting related displayed elements (e.g. similar colors, shapes, or connecting lines or areas).

9 Claims, 9 Drawing Sheets

METHOD AND APPARATUS FOR MANAGING AND DISPLAYING DATA

CROSS-REFERENCE TO RELATED APPLICATION

The present application claims the benefit of and priority to and from U.S. Provisional Patent Application No. 61/827,026 filed May 24, 2013.

FIELD OF THE INVENTION

The present invention relates to the field of database management, and particularly to a method and apparatus for managing and displaying data elements, attributes of data elements and relationships between data elements.

BACKGROUND OF THE INVENTION

It is sometimes desirable to visually display relationships between data elements stored in a database. One example is relationships between data elements representing members of a social network, such as, for example, Facebook, LinkedIn, or Google Plus. Relationships that may exist between members of a social network (and therefore between the data elements associated with those members in the social network's database) include relationships sometimes referred to as "connections," "friends," "circles" and "likes." Further, it is sometimes desired to display certain attributes of members that are part of a relationship. Such attributes may include a members status, location, activities or any other information about the member. Members can include individuals as well as other entities, including fictitious entities.

Webpages are sometimes used to create, manage and display relationships between members of social network databases. For example, a webpage may be used to display members with whom a particular member has a "friend" relationship in the form of a list showing one or more attributes of or associated with the "friend" member, such as, for example, a name or thumbnail image associated with the "friend" member. Alternatively, a webpage may show relationships between members in the form of a graphic circle containing icons or thumbnail images of members that have a "circle" relationship with each other.

There remains a need for a method and apparatus for displaying and managing data elements of databases, and their attributes and relationships, including data elements associated with or representing members of a social network, in a flexible, efficient and effective manner.

SUMMARY OF THE INVENTION

The present invention comprises a novel method and apparatus for displaying and managing relationships between and attributes of data elements of a database, including, without limitation, relationships between and attributes of data elements representing or associated with members of a social network in a social network database. In one or more embodiments, attributes or values of data elements of a database are interpreted as unique locations in a multidimensional environment. Data elements are graphically displayed from the perspective of a point within the multidimensional environment. Attributes of and relationships between data elements are displayed by visual characteristics of the displayed data elements (e.g. location, color, shape, animation) and by graphical elements connecting related displayed elements (e.g. similar colors, shapes, or connecting lines or areas). In one or more embodiments, data elements representing members of a social network are associated with locations and magnitudes of stars from a celestial star catalog such as the NOMAD catalog maintained by the U.S. Naval Observatory. In one or more embodiments, location data for a member data element is derived from the location data of the associated star as specified in the star catalog. In one or more embodiments, data elements are displayed from the viewpoint of a location on the earth's surface, such that the display of the data elements is visually similar to stars in the night sky as seen from an observer on earth. In one or more embodiments, related data elements (e.g. member data elements related as "friends" in a social network database) are indicated by similar colors (e.g. yellow stars indicate related member data elements while white stars indicate unrelated member data elements) or by interconnecting line segments, or by highlighting or marking in some other manner. In one or more embodiments, the interconnecting line segments form "constellations" of related data elements.

DETAILED DESCRIPTION OF THE INVENTION

In the following description, numerous specific details are set forth to provide a thorough description of the invention. However, it will be apparent to those of skill in the art that the invention may be practiced without these specific details. In other instances, well-known features have not been described in detail so as not to obscure the invention.

Figure 1:
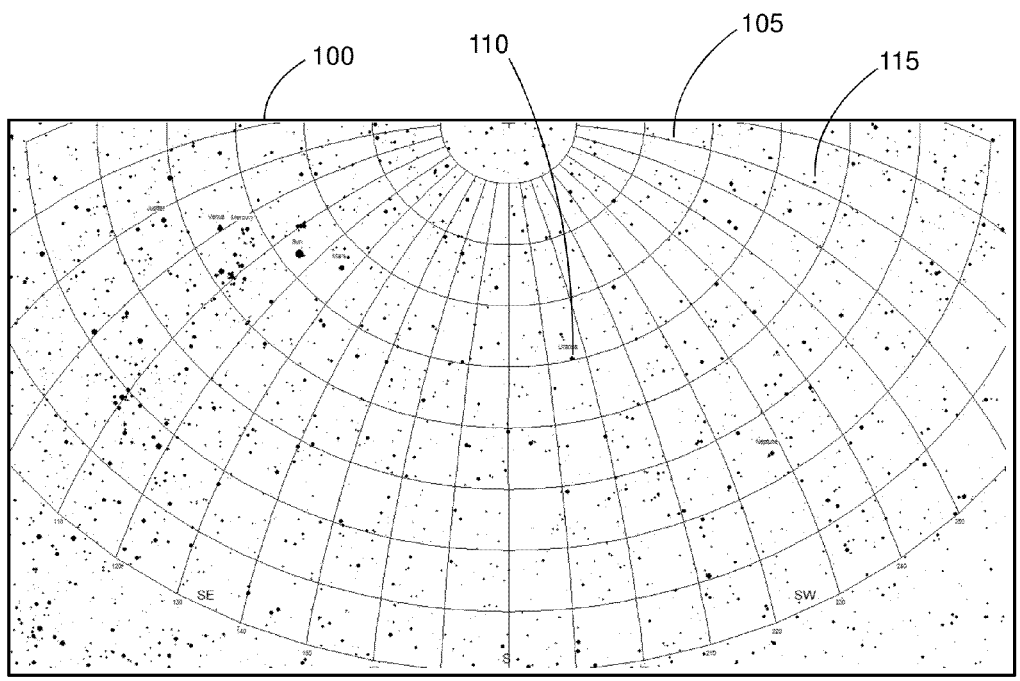
FIG. 1 is a graphic user interface display of an embodiment of the invention.

FIG. 1 shows a graphical user interface display ("GUID") 100 generated by a server system of one or more embodiments of the invention for display on a display screen, including, for example, a computer monitor or the touch screen of a mobile phone, tablet, or other mobile or internet access device. The term "server system" is used in a very broad sense, and, depending on embodiment, may, without limitation, include a separate remote server computer system, or a local server computer system, or a program running on a local computer or on a mobile telephone, tablet, or other internet access or computing device. In the embodiment of FIG. 1, GUID 100 includes gridlines 105, representations of planets 110, and representations of stars 115. In the embodiment of FIG. 1, gridlines 105 extending in arcs generally from side to side represent altitude values, while gridlines 105 extending generally from top to bottom represent azimuth values. Altitude and azimuth are measurements or values often used to identify locations in the sky as seen from a point on the earth's surface at a particular time and location, as known to those of ordinary skill in the art. The altitude and azimuth values for a celestial body change continuously over time, due primarily to the rotation of the earth and movement of the earth around the sun. Star catalogs typically identify locations of stars as seen from a fixed point and time using values referred to as right ascension ("RA") and declination. The positions of stars in the sky from the perspective of the earth do not change rapidly over time. Accordingly, RA and declination values for stars can for many purposes be viewed as relatively unchanging. RA and declination values can be converted to altitude and azimuth values by mathematical formulas that are well known to those of ordinary skill in the art. RA/declination, altitude/azimuth, or similar values used to describe the locations of celestial objects are sometimes referred to herein as "celestial coordinates." The display provided by GUID 100 may be referred to as a "starmap."

In the embodiment of FIG. 1, the location and appearance of representations of stars 115 (referred to herein for brevity simply as "stars 115") are based on at least three values or attributes, which may, for example be RA, declination, and magnitude. In one or more embodiments, the location of a star 115 in GUID 100 depends on the RA and declination values for a star 115, and the appearance (e.g. size, color, brightness, shape, animation or some other visual parameter) of the star 115 in GUID 100 depends on the magnitude value for the star 115.

Table 1 below shows a format of data values used in one or more embodiments of the invention.

TABLE 1

| Index | RA | Decl | Mag |
|---|---|---|---|
| 1 | 0.003385785 | 72.16412166 | 10.772 |
| 2 | 0.00439113 | 76.40701777 | 11.454 |
| 3 | 0.006797625 | 70.88723796 | 10.937 |
| 4 | 0.008551395 | 73.66289182 | 11.923 |
| 5 | 0.012472665 | 75.27709117 | 12.72 |
| 6 | 0.019081485 | 83.10556149 | 9.319 |
| 7 | 0.020514165 | 77.79328652 | 12.868 |
| 8 | 0.027318675 | 75.4832716 | 10.199 |
| 9 | 0.050266875 | 77.75313183 | 11.68 |
| 10 | 0.05526252 | 73.08768283 | 11.557 |

Table 1 includes an index column uniquely identifying a data element and three columns of attributes or values for each data element. For displaying the data elements in Table 1 in GUID 100, the values in the second column are treated as RA values, the values in the third column are treated as declination values, and the values in the fourth column are treated as magnitude values. It will be understood that the attributes/values for the data elements need not actually be RA, declination or magnitude values, but can be values representing any attributes of the data elements. In one or more embodiments, the values in column 2 (i.e. the "RA" values) are normalized to fall within a range of 0 to 360, the values in column 3 (i.e. the "declination" values) are normalized to fall within a range of −90 to 90, and the values in column 4 (i.e. the "magnitude" values) are normalized to fall within a range of 0 to 30.

Figure 2:
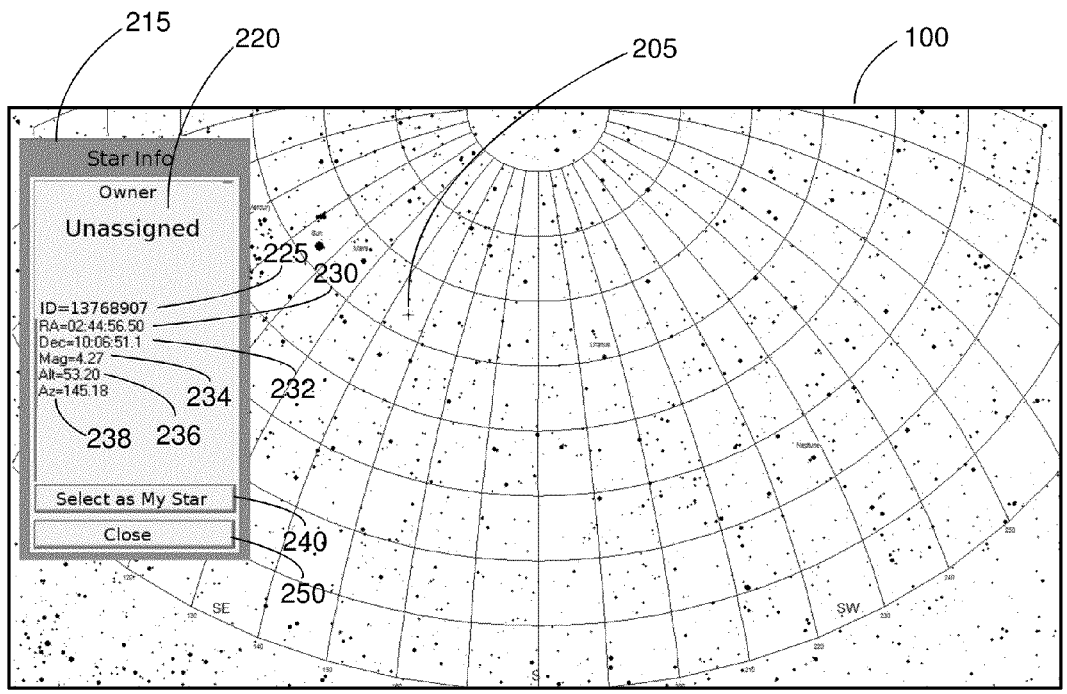
FIG. 2 is a graphic user interface display of an embodiment of the invention.

In one or more embodiments of the invention, GUID 100 is configured to be navigable by a cursor control device such as a mouse or a touch screen. In one or more embodiments, in response to a user input selecting a star 115 (for example touching a star location with a finger in the case of a touch screen display or clicking with a mouse), the display apparatus of the invention displays information about the data element represented by the selected star. In one or more embodiments, the display apparatus receives that information from the server system. In one or more embodiments the information is displayed in a message window or information box. An example of such an information box is shown in FIG. 2. In the embodiment of FIG. 2, a selected star 205 is indicated by a visual indicator, such as cross hairs. Information box 215 shows information about the selected star 205. In the embodiment of FIG. 2, the information shown in information box 215 includes owner information 220, an identification number 225, and RA, declination, magnitude, altitude, and azimuth values 230, 232, 234, 236, and 238, respectively.

In one or more embodiments, a member of a social network may be associated with a star 115. For example, a member of Facebook may be associated with a star in a database of star information. The star information may, for example, be obtained from a star catalog maintained by a scientific organization, such as, for example, the NOMAD star catalog maintained by the U.S. Naval Observatory, which contains data for over 1 billion known stars. In one or more embodiments, GUID 100 shows a selection of stars whose RA, declination and magnitude values have been obtained from the NOMAD star catalog. The selection may be limited, for example, to stars whose magnitude values are below a number such as 6 (in the NOMAD catalog, increasing magnitude values indicate decreasing visual magnitudes), by a range of magnitudes, by showing only unassigned stars (i.e. stars that have not yet been associated with any member), by showing stars that have a relationship with each other (as described below), or in some other manner, including combinations of the foregoing.

In one or more embodiments, for a member of a social network to be able to select a star 115 for association with that member, the member must first sign onto the server system that is providing GUID 100 with a login process as is known to those of ordinary skill in the art. In one or more embodiments, a member of Facebook must login with the member's Facebook login information. Facebook provides API's for third parties to utilize Facebook login processes and data, as is known to those of skill in the art. A member who has logged into the server system providing the GUID's of the invention is sometimes referred to herein as the "logged in member."

In the embodiment of FIG. 2, if a selected star has not been assigned (as indicated, for example, by owner information 220 in information box 215), a user that has logged in with the user's Facebook login information may associate the selected star with that member by activating selection control 240. In response to activation of selection control 240, the server system providing GUID 100 associates the member with the selected star in a database maintained by a database server system, which may be the same or a different server system than the one that is providing GUID 100. In one or more embodiments, the star associated with the logged in member is prominently indicated, such as by indicator 360 in FIG. 3.

In the embodiment of FIG. 2, information box 215 includes a "close" control 250 upon activation of which information box 215 is no longer displayed.

Figure 3:
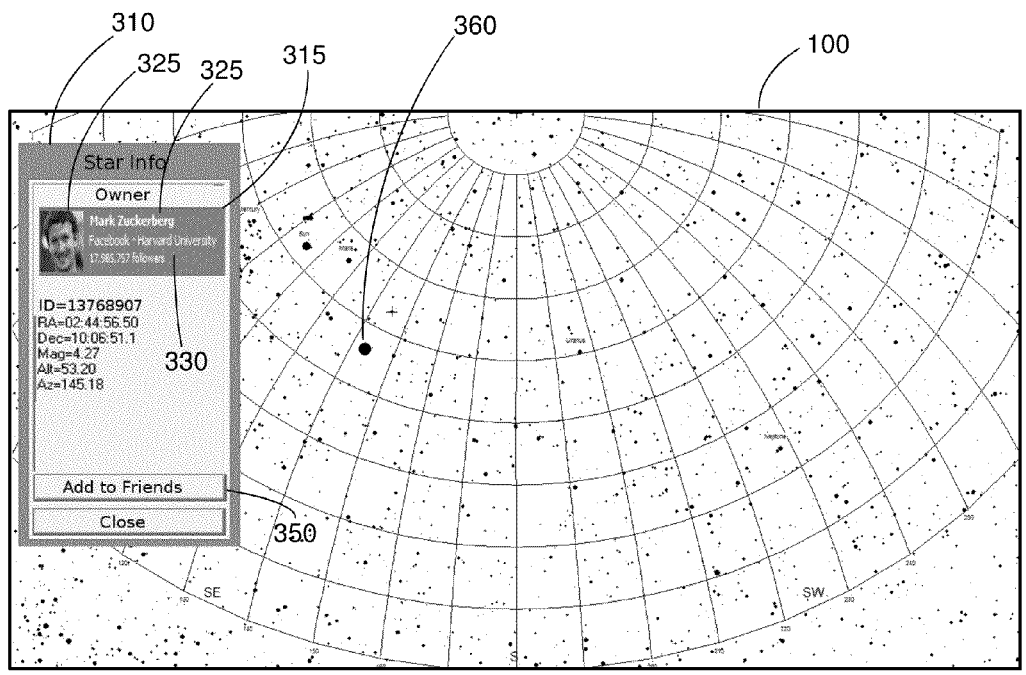
FIG. 3 is a graphic user interface display of an embodiment of the invention.

FIG. 3 shows an information box 310 that is displayed by the server system providing GUID 100 in one or more embodiments of the invention when a star that has been selected is a star that has already been associated with a member of a social network in the database maintained by the database server system. In the embodiment of FIG. 3, owner information 315 in information box 310 includes information about the member with whom the selected star has been associated. In the embodiment of FIG. 3, owner information 315 includes a name 320, a thumbnail image 325, and additional information 330. In one or more embodiments, owner information 315 is obtained by either of the server systems using appropriate mechanisms, such as, for example, API's provided by Facebook or another social network.

In one or more embodiments, when a member of a social network such as Facebook logs into the server system that is providing GUID 100, the server requests available data about the member from the Facebook database using API's and methods made available by Facebook. Such information may include status and location data of the member, information from the member's profile, and information identifying the member's Facebook friends. In one or more embodiments, the server system associates such information with the member in the database maintained by the database server system. In one or more embodiments, the server system uses the location data obtained from Facebook for a logged in member to determine the point of view displayed by GUID 100. In one or more embodiments, the server system determines whether any of the Facebook friends of the logged in member has been associated with a star in the database maintained by the database server.

In the embodiment of FIG. 3, information box 310 includes a control 350 labeled "Add to Friends." In one or more embodiments, control 350 is displayed by the server system providing GUID 100 when a selected star has been assigned to a Facebook member who is not at present a friend of the member who has logged into the server system and who has selected the star for which information box 310 is being displayed. In one or more embodiments, in response to activation of control 350, the server system initiates the sending of a friend request via the Facebook API's to the Facebook member identified by user information 315 in the name of the member who has selected the star for which information box 310 is being displayed.

Figure 4:
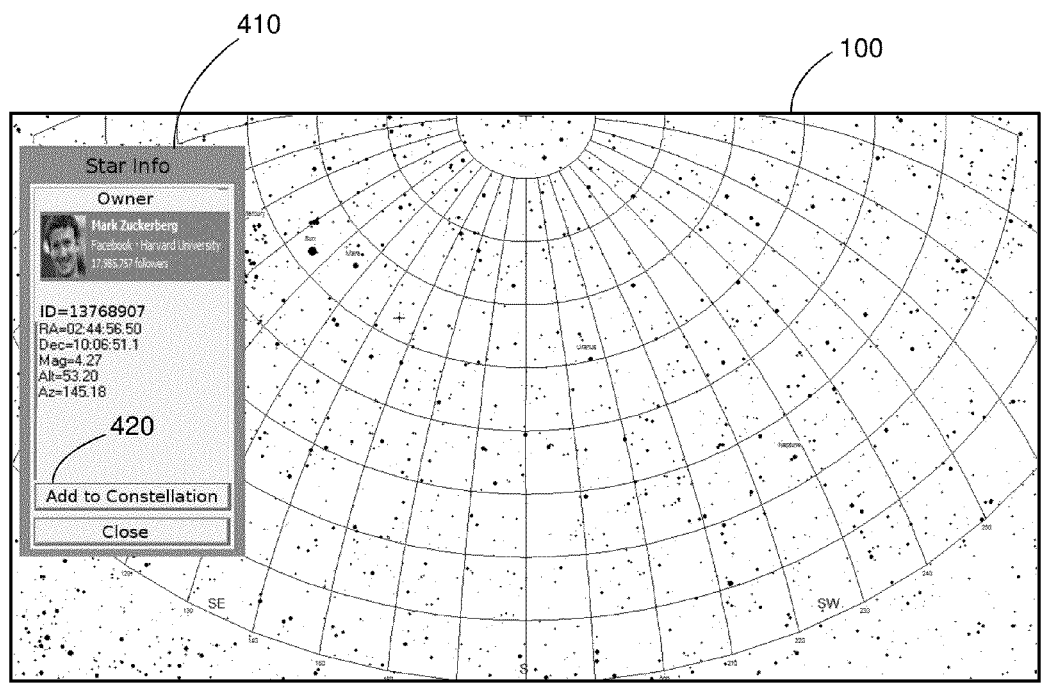
FIG. 4 is a graphic user interface display of an embodiment of the invention.

FIG. 4 shows an embodiment of an information box 410 that is displayed by the server system in one or more embodiments of the invention when the selected star for which information box 410 is displayed has been assigned to a Facebook member who is presently a friend of the member who is logged into the server system and has selected the star for which information box 410 is being displayed. In the embodiment of FIG. 4, information box 410 includes a control 420 labeled "Add to Constellation." In one or more embodiments, the server system provides mechanisms allowing a member to group stars associated with friends of the member with one or more groupings of friends, which are sometimes referred to herein as "constellations." "Constellations" of one or more embodiments of the invention are described in greater detail in connection with FIG. 7 below.

Figure 5:
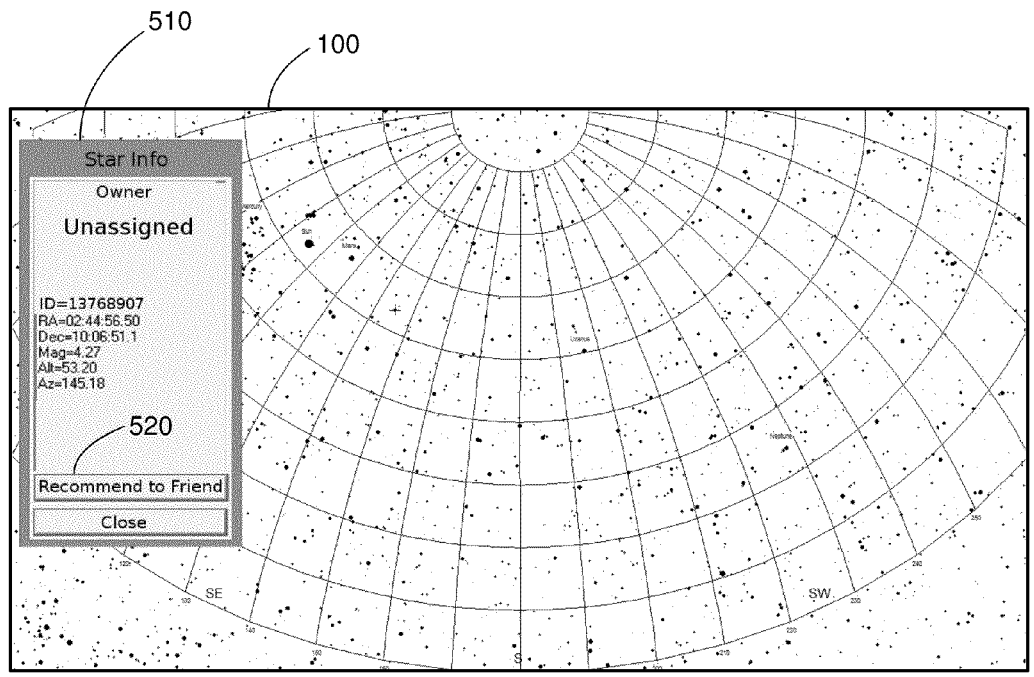
FIG. 5 is a graphic user interface display of an embodiment of the invention.

FIG. 5 shows an embodiment of an information box 510 that is displayed in GUID 100 by the server system in one or more embodiments of the invention when the member who is logged into the server system and to whom GUID 100 is being displayed already has a star associated with the member and selects a star that is presently unassigned. In the embodiment of FIG. 5, information box 510 includes a control 520 labeled "Recommend to Friend." In the embodiment of FIG. 5, in response to activation of control 520, the server system displays an interface that allows the member to select a friend with whom a star has not yet been associated. In one or more embodiments, once the member selects such a friend, the server system interfaces with the Facebook system using appropriate Facebook API's to send the selected friend a message (which may be in the form of an invitation) suggesting that the friend log onto the server system and select the recommended star as the star associated with the friend. In one or more embodiments, the friend may select the recommended star, or any other available unassigned star.

Figure 6:
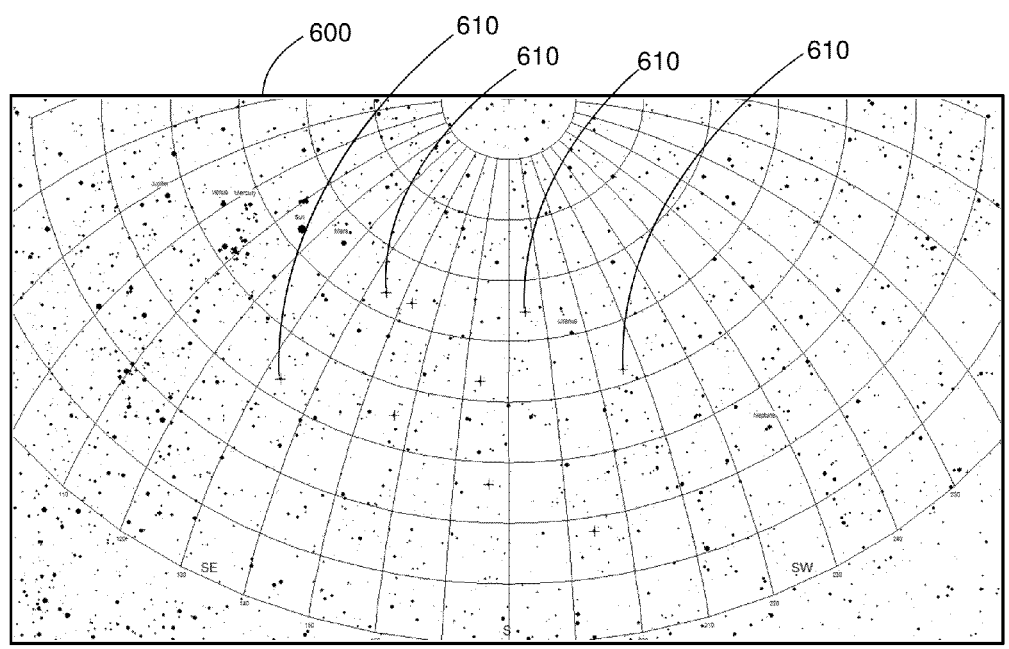
FIG. 6 is a graphic user interface display of an embodiment of the invention.

FIG. 6 shows a GUID 600 that is displayed by the server system of one or more embodiments of the invention. In one or more embodiments, GUID is displayed when the server system receives a command (e.g. by activation of a menu option or control box) to display the stars associated with friends of the logged in member. In the embodiment of FIG. 6, crosshairs 610 indicate stars associated with friends of the logged in member. In other embodiments, any other indicator marks or indications may be used, including, for example, distinguishing colors, sizes, shapes, animations, or combinations thereof. Further, relationships other than friend relationships can be displayed in a similar manner. For example, stars associated with members with whom the logged in member has a "like" relationship—either members that the logged in member has indicated a "like" for, or members who have indicated they "like" the logged in member may be identified by a distinctive visual indication. Similarly, when the logged in member selects a star that is presently assigned to a member (e.g. as in FIG. 3), friend and like relationships, as well as constellation relationships (described below), for the member with whom the selected star is associated can be indicated in a similar manner as they are indicated for the logged in member.

Figure 7:
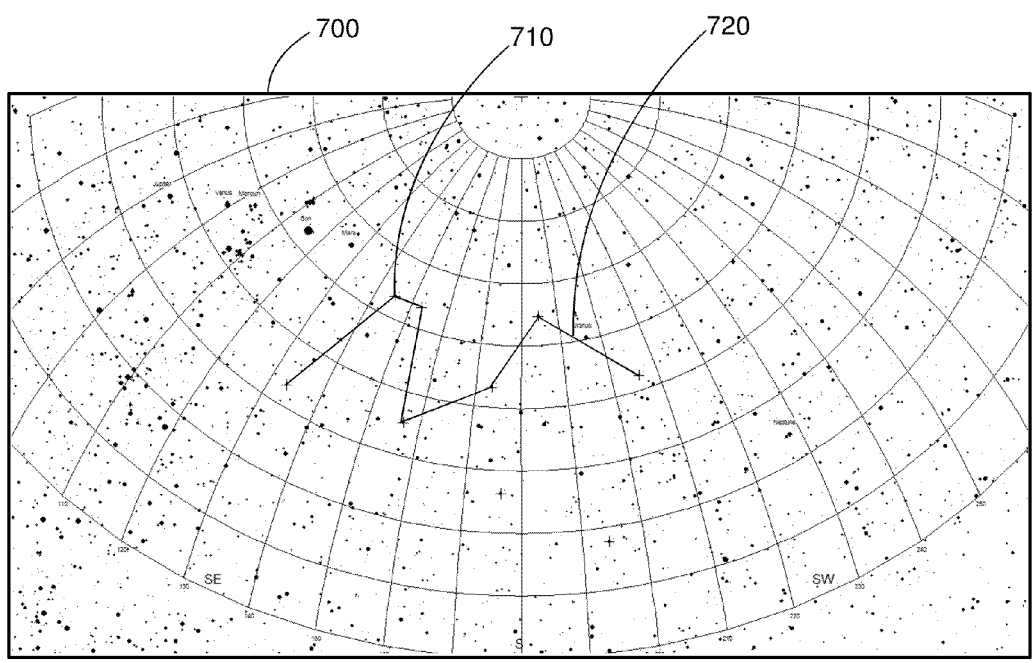
FIG. 7 is a graphic user interface display of an embodiment of the invention.

In one or more embodiments of the invention, the server system provides user interfaces that allow a logged in member to select stars that have been associated with friends of the logged in member for inclusion into one or more groups, sometimes referred to as "constellations." Membership in a group may be indicated any of a variety of ways, including through common shape, color, animations, or graphical interconnections. In the embodiment of FIG. 7, constellation 710 is indicated in GUID 700 by interconnecting line segments 720 joining stars that are associated with friends that are grouped into constellation 710. In one or more embodiments, clicking on a constellation such as constellation 710 causes the server system to display information about the constellation such as, for example, the name of the constellation and the number of members.

In one or more embodiments, the server system provides user interfaces that allow a member to share images of the screen shots displayed by GUID 100 with others. Such images may, for example, show the member's friends' stars and the member's constellations. Such images may be shared, for example, by posting as a Facebook status update or via other well known social network sharing mechanisms or email.

In one or more embodiments, flashing stars or other indicators may be used by GUID 100 to indicate status changes of a member's friends, receipt of messages or comments from or about a member and/or a member's friends, reminders for events or meetings, as well as commercial offers that are available to the logged in member and for which information is displayed when the indicator is selected by the logged in member.

Although the above embodiments have been described primarily in connection with the Facebook social network, the method and apparatus of the invention can be used with any other social network, membership organization, or group in a similar manner. In one or more embodiments, GUID 100 may display information about members of multiple social networks at the same time. For example, if a person is a member of both Facebook and Google+, or Facebook and LinkedIn, or any other combination of social networks or other organizations, GUID 100 can display information about such social networks individually or in combination. For example, a member's Facebook friends may be indicated in one manner (i.e. color, type of indicator, etc.), and that member's Google+ or LinkedIn connections may be shown in another manner. In one or more embodiments, the same person may be associated with separate stars for each social network of which the person is a member. In other embodiments, a person may be associated with a single star regardless of how many social networks the member is associated with, in the database maintained by the database server of the invention.

Other information and data than that described in the above embodiments may be indicated by the visual appearance of a star or groups of stars, as will be apparent to those of ordinary skill in the art.

Figure 8:
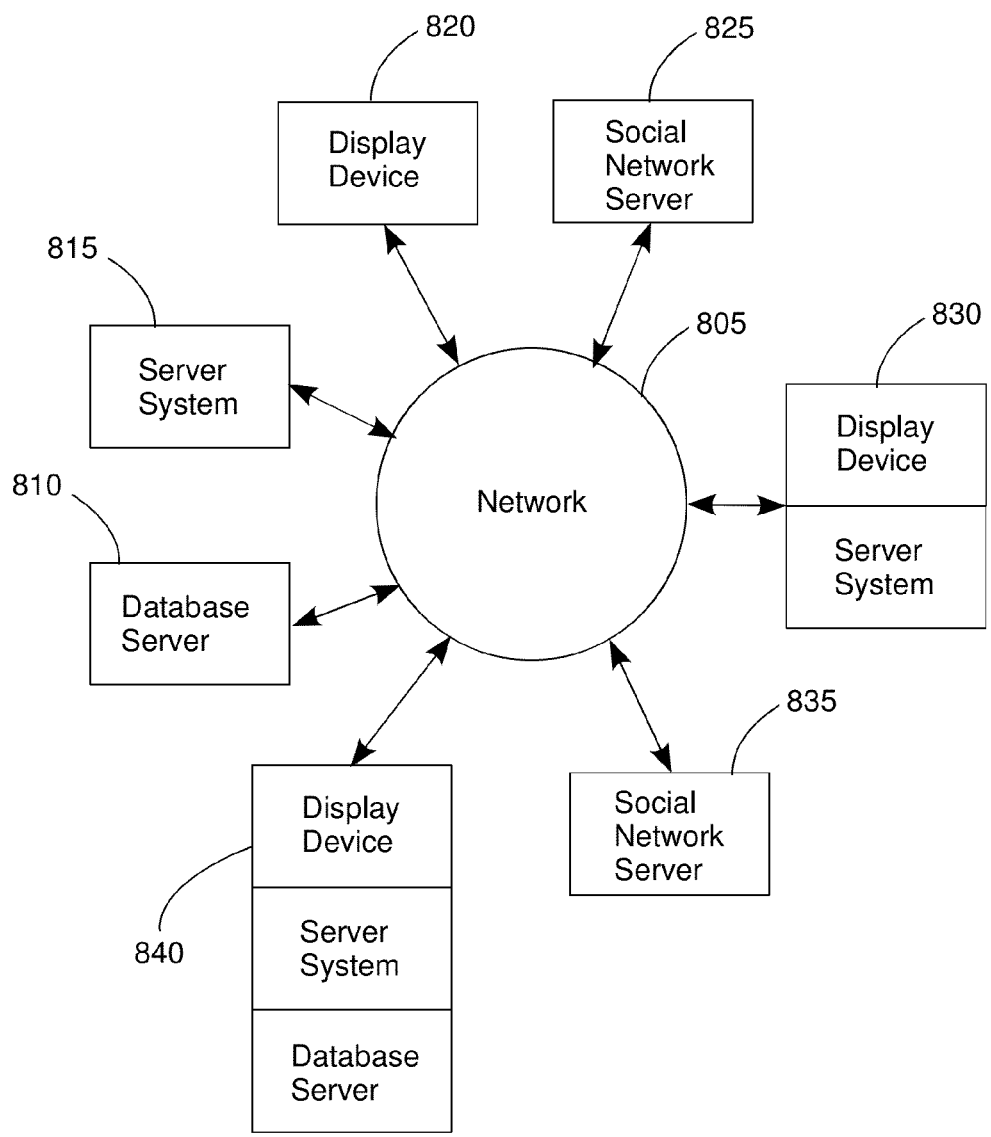
FIG. 8 is a schematic diagram showing apparatus of an embodiment of the invention.

FIG. 8 is a schematic diagram showing apparatus of an embodiment of the present invention. The embodiment of FIG. 8 comprises a plurality of devices or apparatus that are connected to and may communicate with one or more of each other over a network 805 which may, for example, be the internet, a wireless mobile data network, or any other network. The devices/apparatus include a database server 810 that manages a database of star and associated member information, a server system 815, a display device 820 (which may, for example, be a personal computer with a display screen, a mobile phone or tablet with a touch screen display device, a network capable television, or any other display device), social network servers 825 and 835, integrated server system and display device 830, and integrated display device, server system, and database server 840. Integrated devices 830 and 840 may be personal computers, smartphones, tablets, or other computing or intelligent devices capable of providing the functions of the display device and server system (for integrated device 830) or of the display device, server system, and database server (for integrated device 840).

Figure 9:
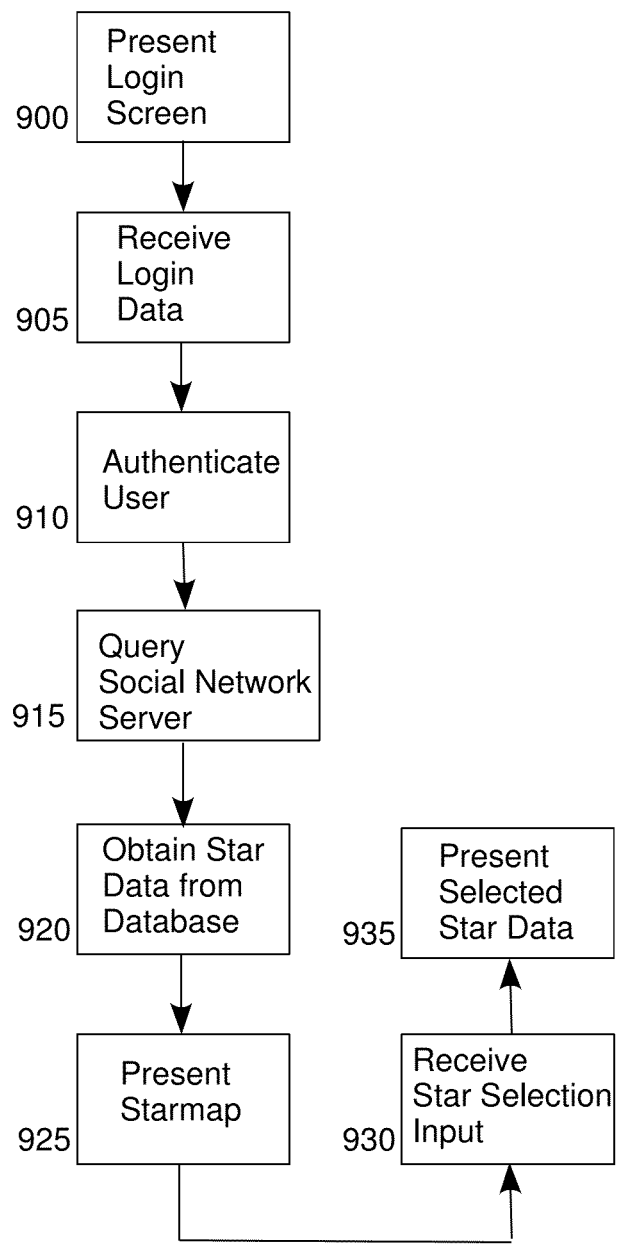
FIG. 9 is a flow chart showing a method performed by a server system of an embodiment of the invention.

FIG. 9 is a flow chart showing method steps performed by a server system of one or more embodiments of the invention. The server system may, for example, be server system 815, or the server system parts of integrated devices 830 and 840 of the embodiment of FIG. 8.

The method of FIG. 9 begins with the server system sending a login screen/user interface to a display device (e.g. display device 820 or the display device parts of integrated devices 830 and 840 of the embodiment of FIG. 8) at step 900. The login screen may, for example, be a web page or part of a web page embodied in HTML, Javascript, or some other page description language or other code or representation. At step 905, the receiver receives login data from the display device. The login data may, for example, be entered at the display device using a keyboard, mouse, touch screen, voice input device, or some other manner as is known in the art. The login data may consist of a login name and password or some other authentication data. At step 910, the server system verifies the login data and authenticates the user for whom the login data has been provided. At step 915, the server system queries a social network server of a social network of which the user is a member (for example, social network server 825 and/or 835 of the embodiment of FIG. 8) using API's provided by the social network to obtain current information about the user, the user's friends, their status, and other data that may be made available by the social network server. At step 920, the server system requests and obtains star and member data from a database server, for example database server 810 of the embodiment of FIG. 8. At step 925, the server system generates and presents a starmap GUID that includes representations of stars for the user and the users friends, as well as additional stars, to the display device. The starmap may a web page or part of a web page embodied in HTML, Javascript, or some other page description language or other code or representation. At step 930, the server system receives a notification that a star has been selected on the display device. The notification may, for example, comprise a notification that a cursor control device has been "clicked" at a particular screen location. Using the screen location information, the server system retrieves data for the selected star from the database server (if the information is not already in the memory of the server system) and presents data about the selected star to the display device for display at step 935.

Thus, a novel method and apparatus for managing and displaying attributes of and relationships between data elements of a database have been presented. Although the invention has been described using specific example embodiments, those of ordinary skill in the art will understand that the invention is not limited to the specific example embodiments described herein. For example, the methods described herein may be performed by remote server computers, by local user computers, by smartphones and tablets, or by any other kind of computing or display device or combination thereof. Further, although embodiments have been described in which data elements represent members of social networks, the invention can be used to show relationships and attributes of any other kind of data element. Further, although the invention has been described as used with a two-dimensional display, it can be used with three dimensional display devices by using three-dimensional location data for the displayed celestrial bodies. Other embodiments will be apparent to those skilled in the art.

The invention claimed is:

1. A data transformation method for transforming relationship data for a plurality of members of a social media network stored in a social media database system into graphical user interface data for display on a display screen of an internet access device by a server system comprising the steps of:

determining by said server system first celestial coordinate values for a first member of said social media network;

transmitting by said server system a query to said social media database system for obtaining first data from said social media database system, said first data comprising said relationship data, said relationship data comprising data identifying a second member of said social media network having a first social media relationship with said first member;

determining by said server system second celestial coordinate values for said second member;

transforming by said server system said relationship data into said graphical user interface data by performing the steps of:

generating by said server system a first image element for said first member;

generating by said server system a second image element for said second member;

generating by said server system a first linking image element indicating said first social media relationship between said first and second members;

generating by said server system a first graphical user interface comprising said first and second image elements and said linking image element; said first image element being located on said graphical user interface at a first location determined by said server system by transforming said first celestial coordinate values into first user interface coordinate values; said second image element being located on said graphical user interface at a second location determined by said server system by transforming said second celestial coordinate values into second user interface coordinate values;

transmitting by said server system said graphical user interface to said internet access device.

2. The data transformation method of claim 1 wherein said relationship data comprises data identifying a third member of said social media network having a second social media relationship with said first member and further comprising the steps of:

generating by said server system a third image element for said third member;

generating by said server system a second linking image element;

including by said server system said third image element in said graphical user interface at a third location determined by said server system by transforming said third celestial coordinate values into third image coordinate values.

3. The data transformation method of claim 2 wherein said second linking image element indicates said second relationship between said first and third members.

4. The data transformation method of claim 3 further comprising the step of including by said server system said second linking image element in said graphical user interface such that it extends between said first and third image elements.

5. The data transformation method of claim 3 further comprising the step of including by said server system said second linking image element in said graphical user interface such that it extends between said second and third image elements.

6. The data transformation method of claim 1 wherein said first celestial coordinate values comprise celestial coordinate values of a first existing heavenly body.

7. The data transformation method of claim 6 wherein said second celestial coordinate values comprise celestial coordinate values of a second existing heavenly body.

8. The data transformation method of claim 7 wherein said first existing heavenly body comprises a star.

9. The data transformation method of claim 8 wherein said first existing heavenly body comprises a planet.

\* \* \* \* \*